United States Patent
Chuy et al.

(10) Patent No.: US 9,941,523 B2
(45) Date of Patent: Apr. 10, 2018

(54) BILAYER CATHODE CATALYST STRUCTURE FOR SOLID POLYMER ELECTROLYTE FUEL CELL

(75) Inventors: Carmen Chuy, Burnaby (CA); Scott McDermid, Vancouver (CA); Herwig Haas, Surrey (CA); Rajeev Vohra, Surrey (CA); Mike Davis, Port Coquitlam (CA)

(73) Assignees: Daimler AG, Stuttgart (DE); Ford Motor Company, Dearborn, MI (US)

( * ) Notice: Subject to any disclaimer, the term of this patent is extended or adjusted under 35 U.S.C. 154(b) by 0 days.

(21) Appl. No.: 13/550,714

(22) Filed: Jul. 17, 2012

(65) Prior Publication Data

US 2013/0022891 A1    Jan. 24, 2013

Related U.S. Application Data

(60) Provisional application No. 61/508,803, filed on Jul. 18, 2011.

(51) Int. Cl.
| | | |
|---|---|---|
| *H01M 4/00* | (2006.01) | |
| *H01M 4/92* | (2006.01) | |
| *H01M 8/1007* | (2016.01) | |

(52) U.S. Cl.
CPC ........... *H01M 4/926* (2013.01); *H01M 4/921* (2013.01); *H01M 8/1007* (2016.02)

(58) Field of Classification Search
CPC ..... H01M 4/926; H01M 8/1007; H01M 4/921
USPC .................................. 429/481, 487
See application file for complete search history.

(56) References Cited

U.S. PATENT DOCUMENTS

| | | | |
|---|---|---|---|
| 2007/0298304 A1* | 12/2007 | Ohma et al. .................... | 429/33 |
| 2008/0138683 A1* | 6/2008 | Yoshikawa ..................... | 429/30 |
| 2011/0008702 A1* | 1/2011 | Connor ............... | H01M 8/0282 |
| | | | 429/468 |
| 2011/0076591 A1* | 3/2011 | Suzuki et al. ................ | 429/480 |

* cited by examiner

*Primary Examiner* — Nicholas P D'Aniello
(74) *Attorney, Agent, or Firm* — Patent Central LLC; Stephan A. Pendorf (57) ABSTRACT

Use of noble metal alloy catalysts, such as PtCo, as the cathode catalyst in solid polymer electrolyte fuel cells can provide enhanced performance at low current densities over that obtained from the noble metal itself. Unfortunately, the performance at high current densities has been relatively poor. However, using a specific bilayer cathode construction, in which a noble metal/non-noble metal alloy layer is located adjacent the cathode gas diffusion layer and a noble metal layer is located adjacent the membrane electrolyte, can provide superior performance at all current densities.

10 Claims, 6 Drawing Sheets

Prior art

BILAYER CATHODE CATALYST STRUCTURE FOR SOLID POLYMER ELECTROLYTE FUEL CELL

FIELD OF THE INVENTION

The present invention pertains to solid polymer electrolyte fuel cells, and particularly to cathode catalyst structures for obtaining improved cell performance over a range of current densities.

BACKGROUND OF THE INVENTION

Solid polymer electrolyte fuel cells electrochemically convert reactants, namely fuel (such as hydrogen) and oxidant (such as oxygen or air), to generate electric power. These cells generally employ a proton conducting polymer membrane electrolyte between two electrodes, namely a cathode and an anode. A structure comprising a proton conducting polymer membrane sandwiched between two electrodes is known as a membrane electrode assembly (MEA). MEAs in which the electrodes have been coated onto the membrane electrolyte to form a unitary structure are commercially available and are known as a catalyst coated membrane (CCM). In a typical fuel cell, flow field plates comprising numerous fluid distribution channels for the reactants are provided on either side of a MEA to distribute fuel and oxidant to the respective electrodes and to remove by-products of the electrochemical reactions taking place within the fuel cell. Water is the primary by-product in a cell operating on hydrogen and air reactants. Because the output voltage of a single cell is of order of 1V, a plurality of cells is usually stacked together in series for commercial applications. Fuel cell stacks can be further connected in arrays of interconnected stacks in series and/or parallel for use in automotive applications and the like.

Catalysts are used to enhance the rate of the electrochemical reactions which occur at the cell electrodes. Catalysts based on noble metals such as platinum are typically required in order to achieve acceptable reaction rates, particularly at the cathode side of the cell. To achieve the greatest catalytic activity per unit weight, the noble metal is generally disposed on a corrosion resistant support with an extremely high surface area, e.g. high surface area carbon particles. However, noble metal catalyst materials are relatively quite expensive. In order to make fuel cells economically viable for automotive and other applications, there is a need to reduce the amount of noble metal (the loading) used in such cells, while still maintaining similar power densities and efficiencies. This can be quite challenging.

One approach considered in the art is the use of certain noble metal/non-noble metal alloys which have demonstrated enhanced activity over the noble metals per se. For instance, alloys of Pt with base metals such as Co have demonstrated circa two-fold activity increases for the oxygen reduction reaction taking place at the cathode in the kinetic operating region (amounting to about a 20-40 mV gain). However, despite this kinetic advantage, such catalyst compositions suffer from relatively poor performance in the mass transport operating regime (i.e. at high power or high current densities). For instance, state-of-the-art commercial CCMs comprising PtCo alloy cathode catalysts with Pt loadings in the range of about 0.25-0.4 mg Pt/cm$^2$) show good performance (about 2 times the mass activity) at low current densities but poor performance at high current densities (e.g. greater than about 1.5 A/cm$^2$) relative to Pt catalysts on the same carbon support. Some of the advantages and disadvantages of such alloys as cathode catalysts are discussed for instance in "Effect of Particle Size of Platinum and Platinum-Cobalt Catalysts on Stability"; K. Matsutani et al., Platinum Metals Rev., 54 (4) 223-232 and "Activity benchmarks and requirements for Pt, Pt-alloy, and non-Pt oxygen reduction catalysts for PEMFCs", H. Gasteiger et al., Applied Catalysis B: Environmental 56 (2005) 9-35.

Thus, neither the common noble metal catalysts nor their alloys seemed able to satisfy the desired performance requirements of many applications at both low and high current densities. Mixtures of various kinds may be considered but with an expectation of a performance compromise at both low and high current densities. So instead, alloy catalyst compositions, such as PtCo, are presently considered predominantly for stationary applications and are less attractive for automotive applications which require higher power density.

There is therefore a continuing need to obtain improved cathode catalysts and/or structures that provide desirable performance at both low and high current densities and while further reducing the amount of expensive noble metal required.

SUMMARY OF THE INVENTION

Superior performance at both low and high current densities can surprisingly be obtained in solid polymer electrolyte fuel cells when using a specific bilayer cathode construction comprising both a noble metal based layer and a noble metal/non-noble metal alloy based layer. Such a solid polymer electrolyte fuel cell comprises an anode, a solid polymer electrolyte, a cathode, an anode fluid diffusion layer adjacent the anode, and a cathode gas diffusion layer adjacent the cathode. The noble metal layer in the cathode is located adjacent the solid polymer membrane electrolyte and it comprises a noble metal catalyst. The noble metal/non-noble metal alloy layer in the cathode is located away from the electrolyte, on the side of noble metal catalyst layer opposite the solid polymer electrolyte and typically adjacent the cathode gas diffusion layer. The noble metal/non-noble metal alloy layer comprises a noble metal/non-noble metal alloy catalyst of a noble metal and a non-noble metal. Other catalyst compositions and/or catalyst layers may be employed in combination with the aforementioned bilayer structure.

At high current densities, it is believed that current is drawn mostly from the vicinity of the cathode-membrane electrolyte interface, so the materials and structure in this region are chosen for performance at high current densities. Noble metal/non-noble metal alloy catalysts, having relatively poor performance at high current densities, are located away from the cathode-membrane interface. In addition at high current densities, the reactant diffusion path appears "longer" because reactants have to travel all the way to that cathode-membrane interface in order to react. Thus, a structure providing for suitable access to this interface is also desired.

Thus, the noble metal layer comprises a noble metal catalyst (e.g. Pt, an alloy of Pt and another noble metal, or a Pt core-shell structure catalyst) which is selected for a high effective catalytic surface area per volume, e.g. Pt supported on a high surface area support (such as a carbon support, a metal oxide support, or mixtures thereof), Pt black, "core-shell" structure catalysts (e.g. in which the catalyst comprises a core of Pd and a monolayer shell of Pt on the core), or the like. The noble metal layer also comprises other materials for high current density operation (such as porous media selected for water transport and gas diffusion purposes) and is structured for high current density operation.

The noble metal/non-noble metal alloy layer comprises a noble metal/non-noble metal alloy catalyst. Again, the noble metal in the noble metal alloy catalyst can be Pt, an alloy of Pt and another noble metal, or a Pt core-shell structure catalyst. The non-noble metal can be Co, Ni, or an alloy thereof. In particular, the alloy catalyst can be alloys such as PtCo, PtNi, or the like. Further, the alloy catalyst may comprise more than one non-noble base metal, e.g. PtCoNi, or may include other noble metal compositions which provide desirable activity at low current densities yet not at high current densities. The alloy catalyst may also be supported on a high surface area support (e.g. a carbon support, a metal oxide support, or a mixture thereof). The noble metal/non-noble metal alloy layer is preferably kept thin and has good gas and water transport properties.

In the bilayer cathode, the loading of the noble metal catalyst in the noble metal catalyst layer can be in the range from about 0.1 to about 0.15 $mg/cm^2$. In a like manner, the loading of the noble metal/non-noble metal alloy catalyst in the noble metal/non-noble metal alloy catalyst layer can also be in the range from about 0.1 to about 0.15 $mg/cm^2$. The ratio of the thickness of the noble metal catalyst layer to the thickness of the noble metal/non-noble metal alloy catalyst layer is in the range from about 1:3 to about 3:1.

In one embodiment of the invention, the cathode may just include the two aforementioned layers, namely consisting essentially of the noble metal catalyst layer and the noble metal/non-noble metal alloy catalyst layer. Further, the noble metal catalyst layer may include just a single catalyst, and thus consist essentially of the noble metal catalyst. In a like manner, the noble metal/non-noble metal catalyst layer may include just the noble metal/non-noble metal alloy catalyst. Of course, the catalyst may comprise further compounds which are typical for catalyst compositions, such as a carbon support, so that, for example, the noble metal catalyst may comprise Pt black.

In another embodiment however, the cathode may comprise an additional layer located between the noble metal catalyst layer and the noble metal/non-noble metal catalyst layer or between the noble metal/non-noble metal catalyst layer and the cathode gas diffusion layer. This additional layer may comprise an additional catalyst.

Generally, the fuel cell of the invention is made by incorporating the noble metal catalyst layer to be adjacent the solid polymer electrolyte on assembly of the fuel cell, and incorporating the noble metal/non-noble metal alloy catalyst layer to be on the side of noble metal catalyst layer opposite the solid polymer electrolyte on assembly of the fuel cell, thereby creating a bilayer cathode.

The bilayer cathode structure can be prepared using various conventional techniques and can be formed on either the membrane electrolyte, or a cathode gas diffusion layer or even provided in a discrete bilayer structure. In the Examples provided herein, successful results were obtained from samples prepared by decal transfer of a bilayer from a coated substrate onto the solid polymer membrane electrolyte.

The present invention addresses the low performance problems of noble metal/non-noble metal alloy cathode catalysts at high current densities while still maintaining their kinetic benefits over the noble metal alone Pt at low current densities. Superior cell performance can be obtained over the range of current densities while minimizing the total amount of noble metal used.

DETAILED DESCRIPTION OF THE PREFERRED EMBODIMENTS

Herein, the following definitions have been used.

In a quantitative context, the term "about" should be construed as being in the range up to plus 10% and down to minus 10%.

A noble metal is one belonging to the group consisting of rhenium, ruthenium, rhodium, palladium, silver, osmium, iridium, platinum, and gold.

A non-noble metal is a metal not belonging to the aforementioned group of noble metals, and particularly includes those known to provide alloys for catalyst purposes that show enhanced activity over the noble metals in the kinetic operating region but relatively poor performance in the mass transport operating regime (such as Co and Ni).

Figure 1:
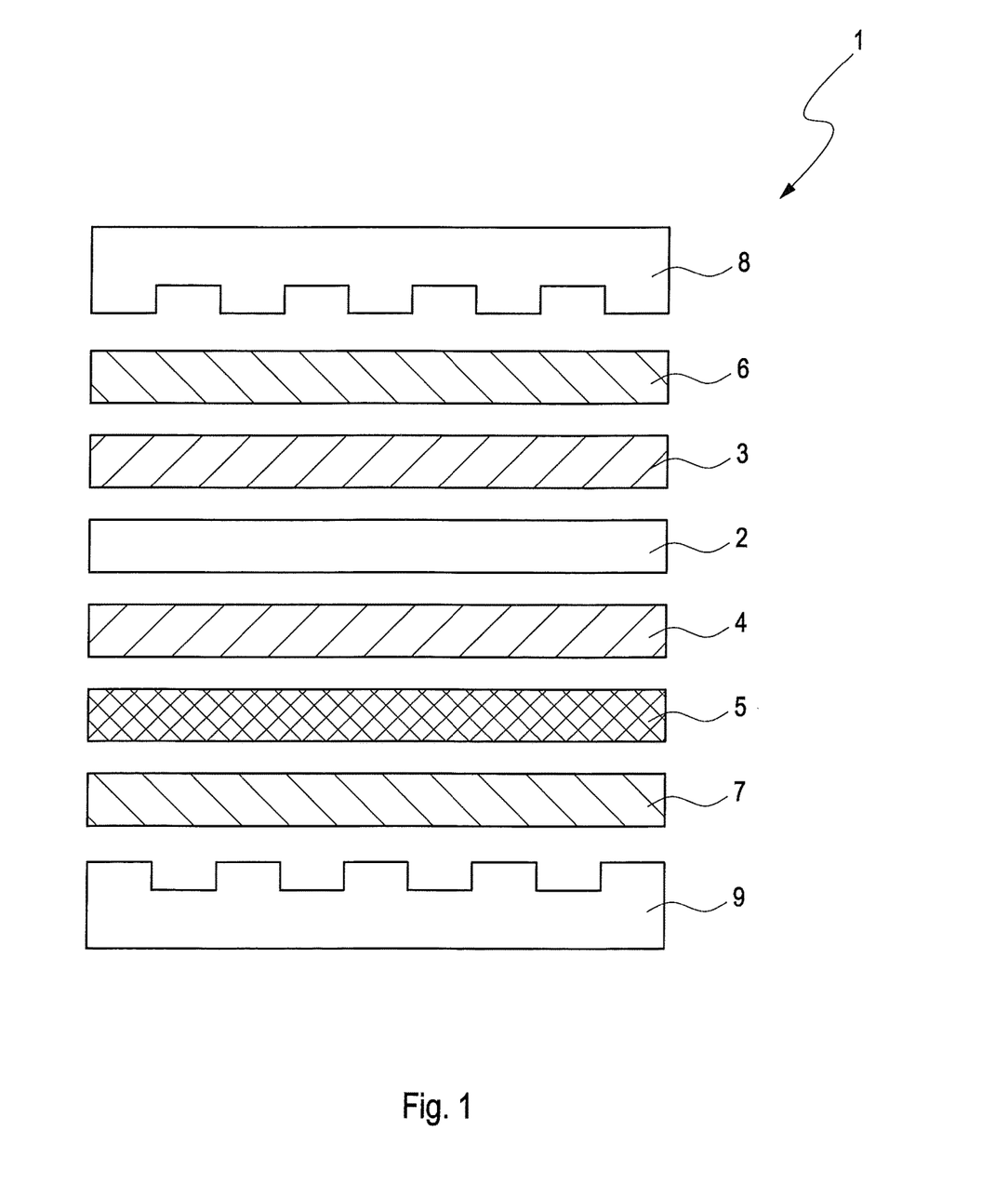
FIG. 1 shows a schematic exploded view of the various components making up a unit cell for an exemplary solid polymer electrolyte fuel cell of the invention.

FIG. 1 shows an exploded schematic view of the various components making up a unit cell for an exemplary solid polymer electrolyte fuel cell of the invention. Unit cell 1 comprises a solid polymer membrane electrolyte 2, anode 3, and a bilayer cathode of the invention comprising noble metal layer 4 and noble metal/non-noble metal alloy layer 5. Adjacent the two cathode and anode electrodes are anode GDL 6 and cathode GDL 7 respectively. (Both anode and cathode GDLs may comprise microporous layers—not shown—applied on the sides nearest electrolyte 2). Adjacent the two GDLs are anode flow field plate 8 and cathode flow field plate 9. Those skilled in the art appreciate that some modest intermixing of the two cathode catalyst layers 4 and 5 may be expected in practice and thus these layers may only be considered to be essentially discrete.

To obtain the desired performance over a range of current densities, noble metal layer 4 comprises a suitable noble metal catalyst, such as Pt supported on a high surface area carbon support, and noble metal/non-noble metal alloy layer 5 comprises a desired noble metal/non-noble metal alloy catalyst, such as PtCo. The thickness and noble metal loading in each layer may be approximately the same.

Cathode noble metal layer 4 and noble metal/non-noble metal alloy layer 5 may be provided in a number of conventional ways. A preferred method starts with a solid-liquid dispersion of suitable ingredients and, using a suitable coating technique, applying a coating of the dispersion to a selected cathode component. For instance, noble metal layer 4 may be applied to a catalyst coated membrane (CCM) in which anode 3 has already been applied to electrolyte 2 to create a unitary CCM assembly. Then, noble metal/non-noble metal alloy layer 5 may be applied onto noble metal layer 4. After each application, the coated component is dried and optionally subjected to other post-treatment (e.g. sintering).

Alternatively however, noble metal/non-noble metal alloy layer 5 and noble metal layer 4 may instead be applied in sequence to cathode GDL 7. Or, one may optionally apply layer 4 and layer 5 separately to a catalyst coated membrane and cathode GDL respectively and then combine these afterwards. Further still, coating techniques can be used to prepare discrete layers (e.g. a coating may be applied to a release film, dried, and then applied under elevated temperature and pressure so as to bond to a selected cathode component).

Dispersions for applying coatings in this manner will typically comprise an amount of the desired catalyst particles, one or more liquids in which the particles are dispersed, and optionally other ingredients such as binders (e.g. ionomer, PTFE) and/or materials for engineering porosity or other desired characteristics in layers 4 and 5. Water is a preferred dispersing liquid but alcohols and other liquids may be used to adjust viscosity, to dissolve binders, and so forth.

Conventional coating techniques, such as Mayer rod coating, knife coating, decal transfer, or other methods known to those skilled in the art, may be employed to apply dispersion onto or into a selected cathode component. Spraying or sputtering techniques may be considered. With potentially more efficient or effective application of catalyst, lower loading amounts may be possible while still achieving satisfactory cell performance.

The bilayer structure of the cathode in unit cell 1 provides for desirable performance over a full range of current densities. Without being bound by theory, it is believed that at high current densities, the current has a tendency to be generated predominantly in the vicinity of the catalyst layer/membrane interface. At low and medium current densities, the polarization characteristics of the bulk electrode will prevail. When using catalyst alloys like PtCo at the fuel cell cathode, the larger particle size (and hence lower surface area) of the PtCo catalyst alloy, the modest increase in contamination of the ionomer with Co base metal (hence affecting proton conductivity), and an increased tendency of the cathode to flood perhaps due to higher hydrophilicity of the alloy, all can cause increased gas diffusivity and water management related problems when compared to typical noble metal catalyst layers. This in turn translates into increased mass transport losses at the cathode. It is further believed that the bilayer cathode construction of the invention addresses these differences by providing for a high effective Pt surface area close to the membrane electrolyte which is needed to sustain the oxygen reduction reaction at high current density. Simultaneously however, a desirably porous cathode catalyst layer is provided by the noble metal layer for water transport and for gases to diffuse at high current density. In concept, it is expected that any noble metal layer having a certain minimum thickness adjacent the membrane electrolyte may qualitatively provide an observed benefit when used in combination with a noble metal/non-noble metal alloy catalyst layer having good kinetic characteristics but showing poor performance at high current densities.

The following Examples have been included to illustrate certain aspects of the invention but should not be construed as limiting in any way. For instance, those skilled in the art will appreciate that the benefits of the invention may be obtained when considering Pt alloys other than PtCo.

EXAMPLES

For illustrative purposes, two conventional fuel cell stacks were assembled in which the cell cathodes were based either on Pt catalyst or PtCo alloy catalyst. The polarization characteristics (voltage versus current density) were then compared.

The stacks comprised 10 fuel cells stacked in series and each cell comprised a catalyst coated membrane (CCM) in which the electrolyte was 18 μm thick ionomer membrane and a standard anode catalyst layer (both from W. L. Gore), and the cathode catalyst was either commercially available Pt or PtCo alloy from Tanaka Kikinzoku Kogyo supported on a carbon support. The total Pt loading by weight was approximately the same for the cells in each stack.

Figure 2:
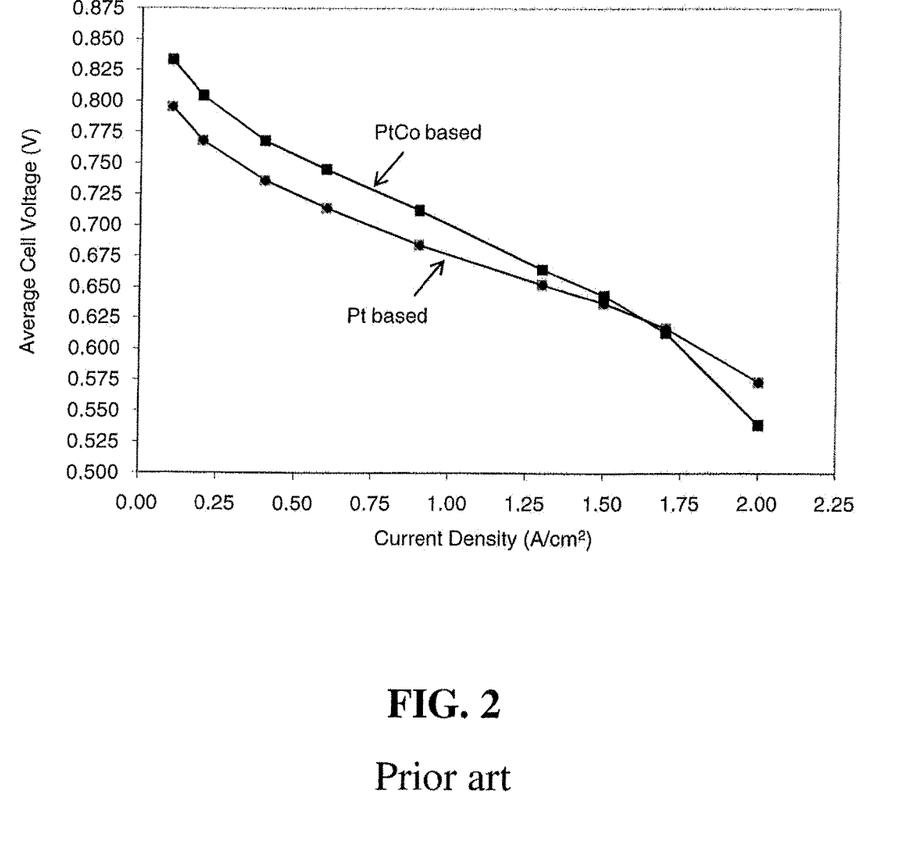
FIG. 2 shows plots of average cell voltage versus current density for a conventional fuel cell stack comprising Pt based cathodes and a conventional stack comprising PtCo alloy based cathodes.

The stacks were supplied with hydrogen and air reactants at stoichiometries of 1.4 and 1.65 respectively and were operated at 68° C. and between about 50-87% relative humidity. (These conditions are representative of typical operating conditions in an automotive application). The polarization characteristics (i.e. voltage versus current density) were determined for each stack. FIG. 2 shows plots of average cell voltage versus current density for each of these conventional Pt based and PtCo alloy based fuel cell stacks. As is evident in this figure, the stack with the PtCo based cathodes showed superior performance at lower current densities but performance dropped off markedly at higher current densities such that it was inferior to the stack with the Pt based cathodes.

This Example illustrates the low current density advantage but high current density disadvantage associated with use of PtCo alloy as the cathode catalyst in a solid polymer electrolyte fuel cell stack.

A series of additional experimental fuel cells was made next with varied cathode constructions. Each cell comprised a catalyst coated membrane (CCM) in which the electrolyte was an 18 μm thick ionomer membrane and a standard anode catalyst layer (again both from W. L. Gore). The cathode catalysts used were either commercially available Pt and/or PtCo alloy from Tanaka Kikinzoku Kogyo supported on a high surface area carbon support. The former comprised 46.3% Pt by weight and the latter comprised 47.4% Pt and 6.4% Co by weight.

The CCMs were made in the following manner. Ink dispersions comprising approximately 20 wt % solids were generally prepared by mixing the selected catalyst, an ionomer solution (e.g. Nafion DE2021 from Du Pont), and a 50/50 by volume mixture of n-propanol alcohol/water in a weight ratio of about 4:9:16. In particular, the ionomer to carbon weight ratios were adjusted to 1:1. The dispersion was then mixed by probe sonification. Electrode layers were then cast by coating the catalyst ink onto PTFE substrates using metering rods and then allowing them to dry at ambient temperature. The total target Pt loading in each electrode was 0.25 mg Pt/cm$^2$. The actual Pt loading was calculated using a gravimetric method and by referencing to the geometric electrode area. The average catalyst layer thicknesses were about 10 μm. CCMs having an active area of about 48 cm² were prepared using a decal-transfer process in which the catalyst coated PTFE substrates were hot pressed (at 150° C. and 15 bar for several minutes) against a commercially obtained 18 μm thick half-CCM (a membrane and anode subassembly from W.L. Gore). Certain of the CCMs were prepared with a bilayer construction. These CCMs were made in a like manner by coating a first catalyst ink onto a PTFE substrate, allowing it to dry at ambient temperature, directly coating a second catalyst ink onto this first dried layer, again allowing it to dry, and then decal transferring this bilayer assembly onto a half-CCM as above. Each of the two layers here comprised about the same amount of Pt by weight for a total combined target loading of again 0.25 mg Pt/cm² (or 0.125 mg Pt/cm² each).

Individual fuel cells were prepared by hot press bonding carbon fibre gas diffusion layers in a similar manner onto each side of each CCM. Then, cell assembly was completed by providing carbon flow field plates having straight flow field channels adjacent each gas diffusion layer.

The experimental cells were operated and tested in common experimental fuel cell stacks in which the cells were stacked in a series stack separated by bus plates. In this way, the cells could be simultaneously operated and tested under identical conditions.

The experimental cells included several comparative cells and two inventive cells as summarized below:

Two comparative cells were made with cathodes comprising only carbon supported Pt catalyst. These cells are denoted "Pt 1" and "Pt 2" in the results below. The total Pt loading in these cells was an average of 0.21 and 0.25 mg Pt/cm² respectively.

A comparative cell was made with a cathode comprising only carbon supported PtCo alloy catalyst. This cell is denoted "PtCo" in the results below. The total Pt loading in this cell was about 0.25 mg Pt/cm².

A comparative cell was made in which the cathodes comprised an admixture of the carbon supported Pt and PtCo alloy catalysts. The cathodes and CCMs were prepared as indicated above using an admixture ink comprising equal amounts by volume of the Pt and PtCo catalyst inks above. This cell is denoted "Pt+PtCo" in the results below. The total Pt loading in this cell was about 0.30 mg Pt/cm².

A comparative cell was made in which a bilayer cathode construction was employed. Here, the cells comprised cathodes with a layer of carbon supported PtCo catalyst adjacent the membrane electrolyte and a separate layer of carbon supported Pt catalyst adjacent the cathode GDL. This cell is denoted "Comparative bilayer" in the results below. The total Pt loading in this cell was about 0.24 mg Pt/cm².

Finally, two inventive cells were made in which again a bilayer cathode construction was employed. However here, the cells were constructed such that the PtCo layer was adjacent the cathode GDL and the Pt layer was adjacent the membrane electrolyte. These cells are denoted "Inventive bilayer 1" and "Inventive bilayer 2" in the results below. The total Pt loading in these cells was about 0.30 and 0.25 mg Pt/cm² respectively.

Experimental stacks comprising comparative and inventive cells as indicated below were assembled and run under two different sets of operating conditions. In both cases, the stacks were supplied with hydrogen and air reactants at flow rates of 10 and 60 slpm respectively. At first, the stacks were run at a high humidity condition (60° C. and both reactants at 100% RH). Then, the stacks were run at a relatively low humidity condition (80° C. and 30% RH). The polarization results for these cells at representative low and high current densities were measured and are tabulated in Tables 1 and 2 below.

TABLE 1

Polarization results at 60° C. and 100% RH

| Cell | Cell voltage at 0.1 A/cm² | Cell voltage at 2.4 A/cm² |
| --- | --- | --- |
| Pt 1 | 865 | 517 |
| PtCo | 885 | 398 |
| Pt + PtCo | 877 | 457 |
| Comparative bilayer | 882 | 459 |
| Inventive bilayer 1 | 878 | 503 |
| Inventive bilayer 2 | 876 | 481 |

TABLE 2

Polarization results at 80° C. and 30% RH

| Cell | Cell voltage at 0.1 A/cm² | Cell voltage at 2.4 A/cm² |
| --- | --- | --- |
| Pt 1 | 848 | 358 |
| PtCo | 858 | 176 |
| Pt + PtCo | 854 | 250 |
| Comparative bilayer | 863 | 253 |
| Inventive bilayer 1 | 861 | 381 |
| Inventive bilayer 2 | 852 | 364 |

As is evident from Tables 1 and 2 above, all the cells provided a similar power output at low load (low current density). As expected, the power output for the PtCo cell was markedly worse than the Pt 1 cell at high load (high current density). Both the admixed Pt+PtCo layer based cell and the Comparative bilayer cell provided a power output at high load somewhere intermediate to the PtCo and Pt cell under both sets of operating conditions. However, both Inventive bilayer cells 1 and 2 provided substantially better performance at high load. Both Inventive bilayer cells provided comparable performance to the Pt cell under the high humidity operating conditions and perhaps even somewhat better performance than the Pt cell under the low humidity condition.

An experimental stack comprising a different set of comparative and inventive cells was assembled, namely the Pt 2, PtCo, Pt+PtCo, Comparative bilayer and Inventive bilayer 1 cells. This stack was then operated under a series of conditions that were considered to be particularly suited for automotive applications.

Figure 3:
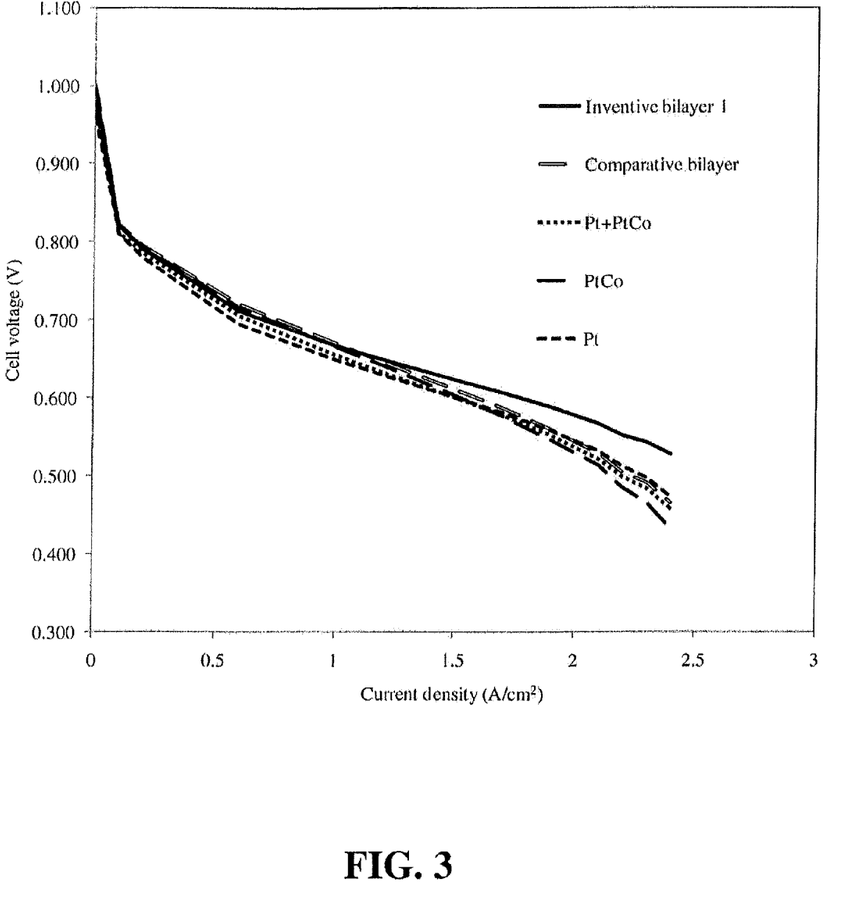
FIG. 3 compares plots of cell voltage versus current density for a cell of the invention and several different comparative cells operating under normal automotive conditions.

In a first test, the stack was operated at 68° C., a relative humidity range varying between about 50-70%, and with both hydrogen and air stoichiometries of 1.65. Again, polarization results were obtained for each cell. FIG. 3 shows the complete polarization data obtained in plots of cell voltage versus current density under these normal automotive conditions.

Figure 4:
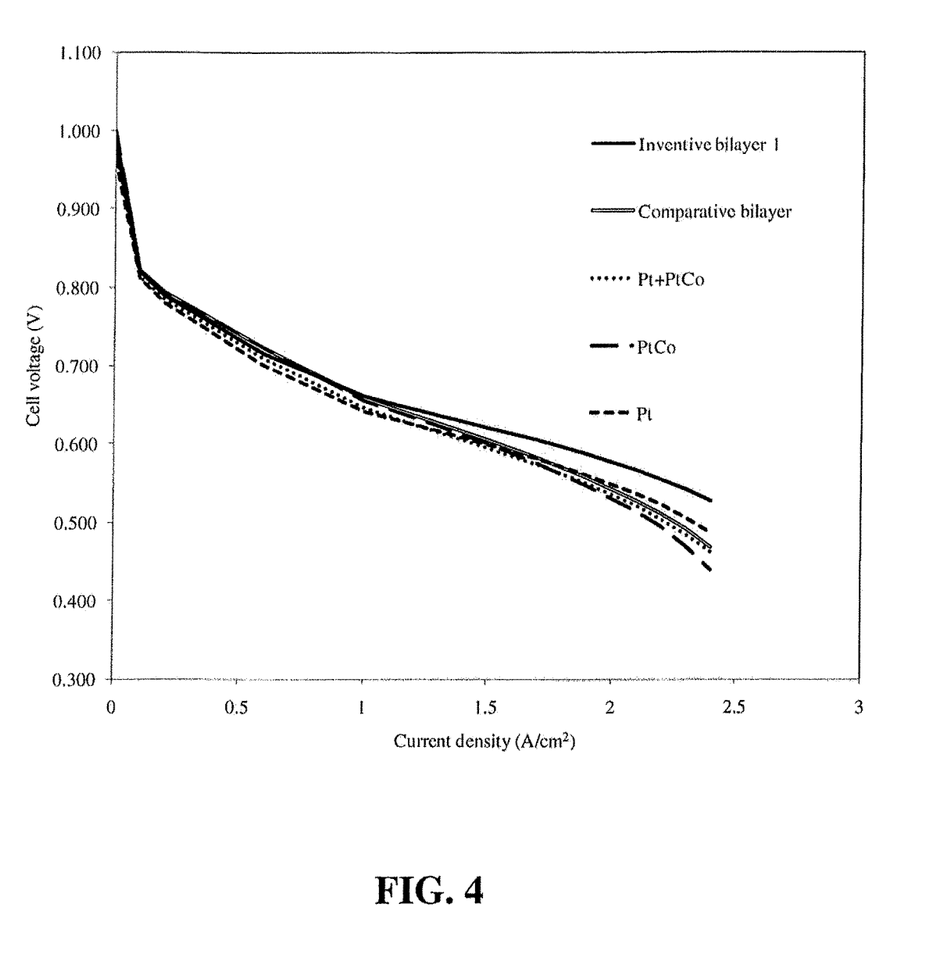
FIG. 4 compares plots of cell voltage versus current density for a cell of the invention and several different comparative cells operating under dry automotive conditions.

In a next test, the stack was operated under a relatively dry set of operating conditions. This involved operating the cell at 68° C., a relative humidity of about 50%, and with both hydrogen and air stoichiometries of 1.65. FIG. 4 compares plots of cell voltage versus current density for the cells under these dry automotive conditions.

Figure 5:
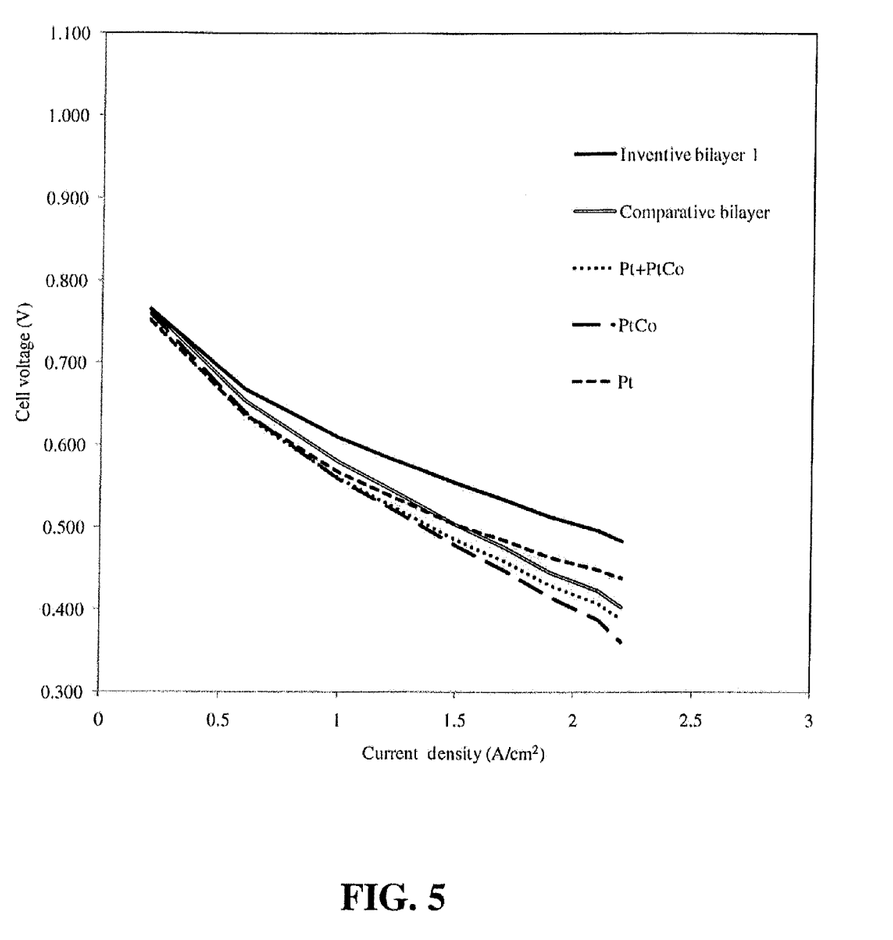
FIG. 5 compares plots of cell voltage versus current density for a cell of the invention and several different comparative cells operating under hot automotive conditions.

In a further test, the stack was operated under a relatively hot set of operating conditions. This involved operating the cell at 85° C., about 40-50% relative humidity, and with both hydrogen and air stoichiometries of 1.65. FIG. 5 compares plots of cell voltage versus current density for the cells under these hot automotive conditions.

Finally, the stack was operated under a set of conditions that might typically be used in starting or warm-up of an automotive stack. This involved operating the cell at 40° C., about 50% relative humidity and with both hydrogen and air stoichiometries of 1.65.

Figure 6:
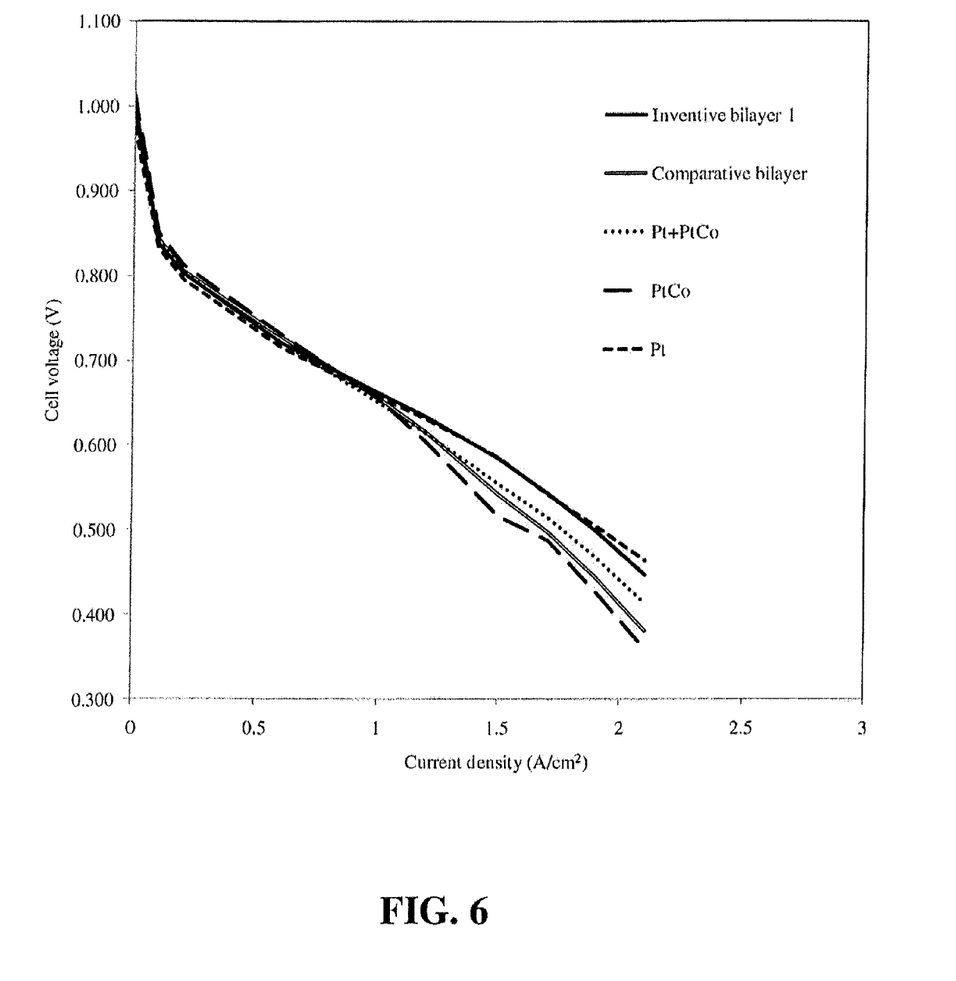
FIG. 6 compares plots of cell voltage versus current density for a cell of the invention and several different comparative cells operating under warm-up automotive conditions.

FIG. 6 compares plots of cell voltage versus current density for the cells under these warm-up automotive conditions.

As before, at low load/current densities all the cells provided comparable output power. The PtCo cell consistently showed the lowest voltage at the highest current densities while the Pt 2 cell showed the highest voltage amongst all the comparative cells. Under the warm-up conditions of FIG. 6, the Inventive bilayer 2 cell provided a similar voltage to that of the Pt 2 cell. However, under all the other operating conditions tested in FIGS. 3, 4 and 5, the Inventive bilayer 2 cell provided an output voltage at the highest current densities that was even superior to that of the Pt 2 cell.

These Examples demonstrate that fuel cells and stacks of the invention can provide the same or superior performance of prior art comparative cells, at both low and high current densities. And the benefits obtained vary depending on the operating conditions.

All of the above U.S. patents, U.S. patent application publications, U.S. patent applications, foreign patents, foreign patent applications and non-patent publications referred to in this specification, are incorporated herein by reference in their entirety.

While particular elements, embodiments and applications of the present invention have been shown and described, it will be understood, of course, that the invention is not limited thereto since modifications may be made by those skilled in the art without departing from the spirit and scope of the present disclosure, particularly in light of the foregoing teachings.

The invention claimed is:

1. A hydrogen/air solid polymer electrolyte fuel cell (SPEFC) comprising:
   an anode,
   a solid polymer electrolyte adjacent the anode,
   a cathode adjacent the solid polymer electrolyte on the side opposite the anode,
   an anode gas diffusion layer adjacent the anode, and
   a cathode gas diffusion layer adjacent the cathode,
   wherein the cathode comprises:
      a Pt catalyst layer adjacent the solid polymer electrolyte and comprising as catalyst only a Pt catalyst; and
      a PtCo alloy catalyst layer on the side of the Pt catalyst layer opposite the solid polymer electrolyte,
   wherein the cathode catalyst layers are adjacent layers, and
   wherein the anode gas diffusion layer includes a microporous layer applied to the side nearest the anode and the cathode gas diffusion layer includes a microporous layer applied to the side nearest the cathode.

2. The fuel cell of claim 1 wherein the Pt catalyst is supported on a carbon support, a metal oxide support, or mixtures thereof.

3. The fuel cell of claim 1 wherein the PtCo alloy catalyst is supported on a carbon support, a metal oxide support, or mixtures thereof.

4. The fuel cell of claim 1 wherein the Pt catalyst is supported on a carbon support and the PtCo alloy catalyst is supported on a carbon support.

5. The fuel cell of claim 1 wherein the loading of the Pt catalyst in the Pt catalyst layer is in the range from about 0.1 to about 0.15 mg/cm$^2$.

6. The fuel cell of claim 1 wherein the loading of the PtCo alloy catalyst in the PtCo alloy catalyst layer is in the range from about 0.1 to about 0.15 mg/cm$^2$.

7. The fuel cell of claim 1 wherein the ratio of the thickness of the Pt catalyst layer to the thickness of the PtCo alloy catalyst layer is in the range from about 1:3 to about 3:1.

8. The fuel cell of claim 1 wherein the PtCo alloy catalyst layer is adjacent the cathode gas diffusion layer.

9. The fuel cell of claim 1 wherein the cathode comprises:
   the Pt catalyst layer adjacent the solid polymer electrolyte; and
   the PtCo alloy catalyst layer adjacent the noble metal catalyst layer.

10. A hydrogen/air solid polymer electrolyte fuel cell (SPEFC) comprising:
   an anode,
   a solid polymer electrolyte adjacent the anode,
   a cathode adjacent the solid polymer electrolyte on the side opposite the anode,
   an anode gas diffusion layer adjacent the anode, and
   a cathode gas diffusion layer adjacent the cathode,
   wherein the cathode comprises:
      a Pt catalyst layer adjacent the solid polymer electrolyte wherein the catalyst consists of Pt; and
      a PtCo catalyst layer on the side of the Pt catalyst layer opposite the solid polymer electrolyte wherein the PtCo catalyst consists of PtCo,
   wherein the cathode catalyst layers are adjacent layers, and
   wherein the anode gas diffusion layer includes a microporous layer applied to the side nearest the anode and the cathode gas diffusion layer includes a microporous layer applied to the side nearest the cathode.

* * * * *